United States Patent
Ni et al.

(12) 
(10) Patent No.: US 10,807,055 B2
(45) Date of Patent: Oct. 20, 2020

(54) DUST REMOVAL SYSTEM FOR CHIMNEY OF MIXER

(71) Applicant: Shandong Laigang Yongfeng Steel and Iron Co., Ltd, Dezhou, Shandong (CN)

(72) Inventors: Guihu Ni, Shandong (CN); Shaojie Zhong, Shandong (CN); Yangang Tang, Shandong (CN)

(73) Assignee: Xiongjun Yan, Shenzhen (CN)

( * ) Notice: Subject to any disclaimer, the term of this patent is extended or adjusted under 35 U.S.C. 154(b) by 224 days.

(21) Appl. No.: 16/050,183

(22) Filed: Jul. 31, 2018

(65) Prior Publication Data

US 2019/0060856 A1 Feb. 28, 2019

(30) Foreign Application Priority Data

Aug. 31, 2017 (CN) .......................... 2017 1 0775595

(51) Int. Cl.
*B01F 15/00* (2006.01)
*B01D 47/02* (2006.01)
*B01D 47/12* (2006.01)

(52) U.S. Cl.
CPC ...... *B01F 15/00961* (2013.01); *B01D 47/021* (2013.01); *B01D 47/12* (2013.01); *B01F 15/00993* (2013.01); *B01D 2247/04* (2013.01)

(58) Field of Classification Search
CPC ...... B01D 47/02; B01D 47/021; B01D 47/12; B01F 15/00961; B01F 15/00993
See application file for complete search history.

(56) References Cited

U.S. PATENT DOCUMENTS

| 6,626,983 B1* | 9/2003 | Cairns ...................... F01N 3/04 95/226 |
| 2006/0021337 A1* | 2/2006 | Brady .................. B01D 47/022 60/310 |

FOREIGN PATENT DOCUMENTS

CN 203170266 U * 9/2013 .............. B01F 15/00

OTHER PUBLICATIONS

Ma, Naiyang, "Recycling of Sinter Plant Offgas Cleaning System Dust by Pre-Agglomeration", Energy Technology 2015: Coarbon Dioxide Management and Other Technologies, pp. 193-200. (Year: 2015).*

(Continued)

*Primary Examiner* — Renee Robinson
(74) *Attorney, Agent, or Firm* — Wayne & Ken, LLC; Tony Hom

(57) ABSTRACT

The present invention provides a dust removal system for a chimney of a mixer. The system includes a dust removal water tank and a first pipeline. One end of the first pipeline is communicated with an outlet of the chimney at a tail of the mixer, and the other end is inserted into the dust removal water tank. A water inlet and a water outlet are provided in the dust removal water tank. An exhaust port for discharging filtered gas is provided in an upper part of the dust removal water tank. The system does not need additional power, and is energy-saving and environmentally friendly. Water vapor discharged facilitates the sedimentation of dust particles in the mixer, thereby reducing loss of raw material mixture, making sintering quality more stable and solving a problem that gas discharged in prior arts contains more powder and pollutes the environment.

2 Claims, 1 Drawing Sheet

(56) References Cited

OTHER PUBLICATIONS

English Machine translation of CN 203170266U, obtained from Google Patents. (Year: 2013).*

* cited by examiner

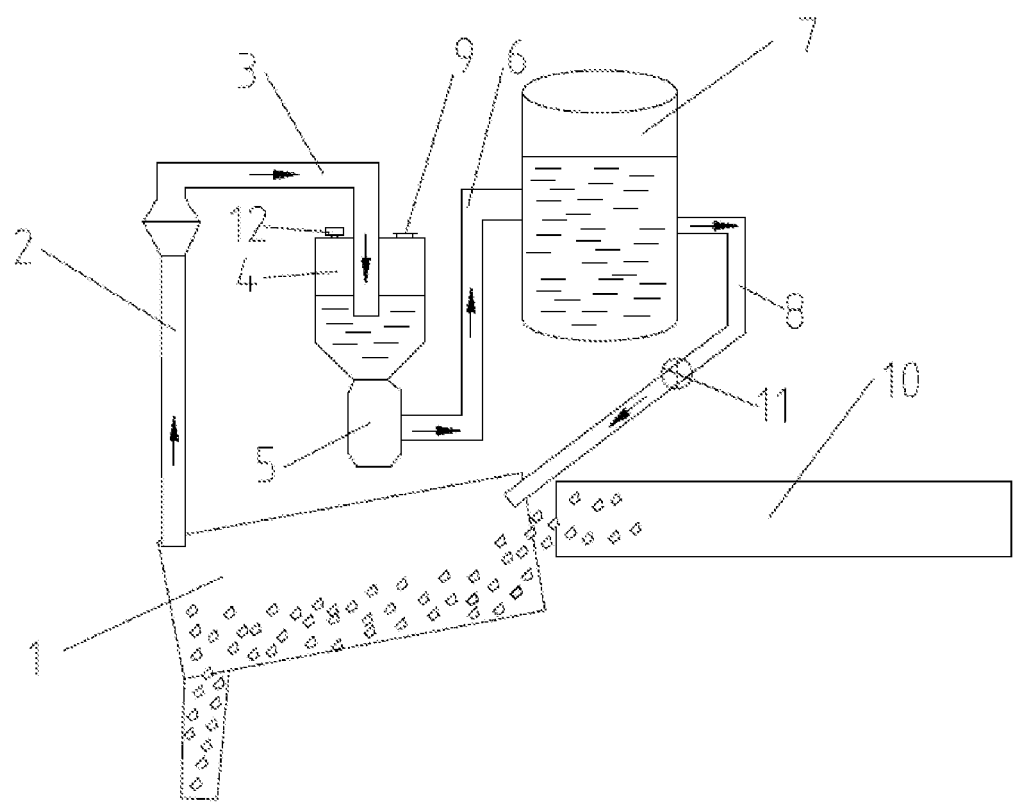

DUST REMOVAL SYSTEM FOR CHIMNEY OF MIXER

TECHNICAL FIELD

The present invention relates to the field of mixers, and in particular to a dust removal system for a chimney of a mixer.

BACKGROUND

Mixer is the main equipment in sintering process and is an equipment for mixing various materials. In the process of secondary sintering, as the temperature in a mixer is high, a large amount of water vapor is produced. Therefore, a chimney for discharging the water vapor is generally provided at the tail of a sintering machine, so as to avoid increasing the pressure in the mixer due to accumulation of water vapor. However, in the process of discharging the water vapor through the chimney, dust particles are often discharged out, causing atmospheric pollution and slight change in the components of mixtures to be sintered. Although some related dust removal apparatuses exist in the prior art, most of them suck out dust-containing airflows through an induced draft fan. This brings the problem that the dust particles carried away by the water vapor are increased, because the suction force generated by the induced draft fan carries away the mixture particles, left by the water vapor, via the airflows, thereby seriously affecting the stability of sintering quality. Therefore, it is urgent to provide a dust removal system of a mixer chimney, so as to remove the dust for the water vapor in the mixer chimney without increasing particle dispersion of the mixture.

SUMMARY

In view of the above disadvantages of the prior art, the present invention aims to provide a dust removal system of a mixer chimney, so as to solve the problem that gas discharged by the mixer chimney in the prior art contains more powder and pollutes the environment.

To achieve the above purpose and other related purposes, the present invention provides a dust removal system of a mixer chimney, comprising a dust removal water tank and a first pipeline. One end of the first pipeline is communicated with an outlet of the chimney at a tail of the mixer, and the other end is inserted into the dust removal water tank. A water inlet and a water outlet are provided in the dust removal water tank. An exhaust port for discharging filtered gas is also provided in the upper part of the dust removal water tank.

Preferably, the dust removal system with a mixer and a chimney further comprises a sedimentation chamber, a water pump and a second pipeline. The water outlet in the dust removal water tank is communicated with a liquid suction port of the water pump. One end of the second pipeline is communicated with a liquid outlet of the water pump, and the other end is communicated with a liquid inlet of the sedimentation chamber.

Preferably, the dust removal system with a mixer and a chimney further comprises a third pipeline and a valve provided on the third pipeline. The sedimentation chamber is provided at an upper part of a mixer. One end of the third pipeline is communicated with a liquid outlet of the sedimentation chamber, and the other end is communicated with a feeding end of a trough of the mixer.

Further, the third pipeline is communicated to the upper part of a feeding port of the trough.

Preferably, the first pipeline is inserted into a pipe wall of one end in the dust removal water tank, and is also provided with a plurality of small through holes; and the plurality of small through holes are respectively provided at different heights.

Preferably, the bottom of the dust removal water tank is an inverted taper; and the water outlet is mounted at the most narrow point of the inverted taper.

Preferably, a filtering valve is also mounted on the exhaust port.

As mentioned above, the present invention has the following beneficial effect: In the present invention, the dust removal water tank is communicated with the upper outlet of the chimney through the first pipeline; during use, water is added into the dust removal water tank through the water inlet; when the water exceeds the end of the first pipeline, the water is not added; as water vapor in the mixer accumulates, a certain pressure difference is generated between gas in the mixer and water pressure at the end of the first pipeline that is immersed in the water; when the pressure of the water vapor in the mixer is greater than the water pressure at the end of the first pipeline, the water vapor is introduced into the water, and dust particles in the water vapor and water drips are dissolved in the water; and filtered clean air is discharged from the exhaust port. The system does not need additional power, and thus is energy-saving and environmentally friendly. Meanwhile, since the water vapor in the mixer can be discharged under certain pressure, it is easier to settle the dust particles, thereby reducing loss of mixed raw materials and making sintering quality more stable.

In the present invention, the first pipeline is inserted into the pipe wall of one end in the dust removal water tank, and is also provided with many small through holes; and the holes are respectively mounted at different heights. In this way, on one hand, the filtering area of the water vapor and the water can be increased, and on the other hand, if the end of the first pipeline is inserted deeply, the water vapor can spill from a hole at a lower pressure at the upper part, thereby avoiding too high pressure of the water vapor in the mixer due to too much water injected.

DESCRIPTION OF DRAWINGS

The FIGURE is a structural schematic diagram of an embodiment of a dust removal system of a mixer chimney in the present invention.

In the FIGURE: 1 mixer; 2 chimney; 3 first pipeline; 4 dust removal water tank; 5 water pump; 6 second pipeline; 7 sedimentation chamber; 8 third pipeline; 9 water inlet; 10 feeding belt; 11 valve; 12 filtering valve

DETAILED DESCRIPTION

Structures, proportions and sizes in the drawings of the description are only used to match with the disclosure in the description for those skilled in the art to understand and read, not intended to limit implementation of the present invention, so technically have no substantive meaning. Any structural modification, proportional change or adjustment of sizes shall still be included in the scope covered by the technical contents revealed in the present invention without affecting the effects generated by the present invention and the purposes achieved by the present invention. Meanwhile, terms such as "upper", "lower", "front", "rear", "middle", etc. cited in the description are only used for clear illustration, not intended to limit the implementation scope of the present invention. Change or adjustment of relative relationships shall be included in the implementation scope of the present invention without substantially changing the technical contents.

As shown in the FIGURE, the present invention provides a dust removal system of a mixer chimney, comprising a dust removal water tank 4 and a first pipeline 3. One end of the first pipeline 3 is communicated with an outlet of a chimney 2 of a tail of a mixer 1, and the other end is inserted into the dust removal water tank 4. A water inlet 9 and a water outlet are mounted in the dust removal water tank 4. Exhaust port for discharging filtered gas is also mounted in the upper part of the dust removal water tank 4.

In the present invention, the dust removal water tank 4 is communicated with an upper outlet of the chimney 2 through the first pipeline 3; during use, water is added into the dust removal water tank 4 through the water inlet 9; when the water exceeds the end of the first pipeline 3, the water is not added; as water vapor in the mixer 1 accumulates, a certain pressure difference is generated between gas in the mixer 1 and water pressure at the end of the first pipeline 3 that is immersed in the water; when the pressure of the water vapor in the mixer 1 is greater than the water pressure at the end of the first pipeline 3, the water vapor is introduced into the water, and dust particles in the water vapor and water drips are dissolved in the water; and filtered clean air is discharged from the exhaust port. The system does not need additional power, and thus is energy-saving and environmentally friendly. Meanwhile, since the water vapor in the mixer 1 can be discharged under certain pressure, it is easier to settle the dust particles in the mixer 1, thereby reducing loss of mixed raw materials and making sintering quality more stable.

Because the precipitated water in the dust removal water tank 4 can be reused, the dust removal system with a mixer and a chimney in the present embodiment further comprises a sedimentation chamber 7, a water pump 5 and a second pipeline 6. The water outlet in the dust removal water tank 4 is communicated with a liquid suction port of the water pump 5. One end of the second pipeline 6 is communicated with a liquid outlet of the water pump 5, and the other end is communicated with a liquid inlet of the sedimentation chamber 7. When the water in the dust removal water tank 4 reaches certain saturation, the water pump 5 is turned on to pump the water in the dust removal water tank 4 into the sedimentation chamber 7 to settle. After the water pump 5 is turned off and new clean water is added from the water inlet 9 of a dust removal pipe, next round of filtration and dust removal can be started. In the present embodiment, the settled water in the sedimentation chamber 7 can be reused, thereby saving water source and protecting the environment.

Because a feeding port of the mixer 1 of the present invention feeds material through a feeding belt 10, and water needs to be added at the feeding port to remove dust. The dust removal system with a mixer and a chimney in the present embodiment further comprises a third pipeline 8 and a valve 11 mounted on the third pipeline 8. The sedimentation chamber 7 is mounted at an upper part of the mixer 1. One end of the third pipeline 8 is communicated with a liquid outlet of the sedimentation chamber 7, and the other end is communicated with a feeding end of a trough of the mixer 1. In this way, self-digestion of the system can be realized, without the need to dispose the water in the sedimentation chamber 7. After the water in the sedimentation chamber 7 is used up, settled dust particles in the sedimentation chamber 7 can be discharged out from a slag outlet. To better remove the dust in the feeding end of the mixer 1, the third pipeline 8 is communicated with the upper part of the feeding port of the trough in the present embodiment. In this way, in the dropping process of the water from top to bottom, a dust airflow is sprayed, so as to bring the dust in the dust airflow back into the mixer 1.

In the present embodiment, the first pipeline 3 is inserted into the pipe wall of one end in the dust removal water tank 4, and is also provided with many small through holes; and these holes are respectively mounted at different heights. In this way, on one hand, the filtering area of the water vapor and the water can be increased, and on the other hand, if the end of the first pipeline 3 is inserted deeply, the water vapor can spill from a hole at a lower pressure at the upper part, thereby avoiding too high pressure of the water vapor in the mixer 1 due to too much water injected.

In the present embodiment, the bottom of the dust removal water tank 4 is an inverted taper; and the water outlet is mounted at the most narrow point of the inverted taper. In this way, the liquid inlet of the water pump 5 is directly communicated with the water outlet provided at the most narrow point of the taper, which makes it easier to discharge the water that contains powder in the dust removal water tank 4, thereby avoiding affecting the efficiency of dissolving the dust particles in the water, because the dust is not fully discharged and is stagnated in newly injected water.

In the present embodiment, a filtering valve 12 is also mounted on the exhaust port. The filtering valve 12 can be any of air filters on the market, and can intercept the undissolved dust particles.

In conclusion, the system does not need additional power, and thus is energy-saving and environmentally friendly. Meanwhile, since the water vapor in the mixer can be discharged under certain pressure, it is easier to settle the dust particles in the mixer, thereby reducing loss of mixed raw materials, making the sintering quality more stable and solving the problem that gas discharged by the mixer chimney in the prior art contains more powder and pollutes the environment. Therefore, the present invention solves some practical problems in the prior art, and thus is highly useful and meaningful.

The above embodiments are only used to exemplarily describe the principles and effects of the present invention rather than limiting the present invention. Many aspects of the present invention can be improved without departing from the overall thought. Those skilled in the art can modify or change the above embodiments without departing from the spirits and the scope of the present invention. Therefore, all equivalent modifications or changes completed by ordinary intellectuals in the technical field without departing from spirits and technical thoughts revealed in the present invention shall still be covered by claims of the present invention.

What is claimed is:

1. A dust removal system for a chimney of a mixer, comprising a dust removal water tank and a first pipeline; wherein one end of the first pipeline is communicated with an outlet of the chimney at a tail of the mixer, and the other end is inserted into the dust removal water tank; a water inlet and a water outlet are provided in the dust removal water tank; and an exhaust port for discharging filtered gas is also provided in an upper part of the dust removal water tank;

the dust removal system further comprises a sedimentation chamber, a water pump and a second pipeline; the water outlet in the dust removal water tank is communicated with a liquid suction port of the water pump; and one end of the second pipeline is communicated with a liquid outlet port of the water pump, and the other end of the second pipeline is communicated with a liquid inlet of the sedimentation chamber; and the dust removal system further comprises a third pipeline and a valve installed on the third pipeline; the sedimentation chamber is provided above the mixer; and one end of the third pipeline is communicated with a liquid outlet of the sedimentation chamber, and the other end of the third pipeline is communicated with a feeding end of a trough of the mixer.

2. The dust removal system of claim 1, wherein the third pipeline is communicated with an upper part of a feeding port of the trough.

* * * * *